(12) United States Patent
Reinheimer

(10) Patent No.: US 7,820,736 B2
(45) Date of Patent: Oct. 26, 2010

(54) INTUMESCING, MULTI-COMPONENT EPOXIDE RESIN-COATING COMPOSITION FOR FIRE PROTECTION AND ITS USE

(75) Inventor: Arne Reinheimer, Irsee (DE)

(73) Assignee: Hilti Aktiengesellschaft, Schaan (LI)

( * ) Notice: Subject to any disclaimer, the term of this patent is extended or adjusted under 35 U.S.C. 154(b) by 330 days.

(21) Appl. No.: 11/986,103

(22) Filed: Nov. 19, 2007

(65) Prior Publication Data

US 2008/0121851 A1    May 29, 2008

(30) Foreign Application Priority Data

Nov. 29, 2006   (DE) .................. 10 2006 056 403

(51) Int. Cl.
| | |
|---|---|
| *C08K 5/3492* | (2006.01) |
| *C08K 5/05* | (2006.01) |
| *C08K 5/51* | (2006.01) |
| *C08K 5/52* | (2006.01) |
| *C08K 3/26* | (2006.01) |
| *C08K 3/32* | (2006.01) |
| *C08K 3/38* | (2006.01) |
| *C09K 21/06* | (2006.01) |

(52) U.S. Cl. .................. 523/179; 252/606; 252/609; 524/100; 524/127; 524/387; 524/405; 524/416; 524/425

(58) Field of Classification Search ............. 252/606, 252/609; 523/179; 524/100, 127, 387, 405, 524/416, 425

See application file for complete search history.

(56) References Cited

U.S. PATENT DOCUMENTS

| 4,486,553 A | 12/1984 | Wesch et al. |
| 4,808,476 A | 2/1989 | Mikus et al. |
| 5,487,946 A * | 1/1996 | McGinniss et al. .......... 428/413 |
| 6,960,388 B2 * | 11/2005 | Hallissy et al. ............. 428/372 |

FOREIGN PATENT DOCUMENTS

WO    97/42270 A1   11/1997

OTHER PUBLICATIONS

"Vinylester," Auszug aus Römpp Online, p. 1 (printed Jul. 11, 2007).

* cited by examiner

*Primary Examiner*—Kriellion A Sanders
(74) *Attorney, Agent, or Firm*—Abelman, Frayne & Schwab

(57) ABSTRACT

An intumescing, multi-component epoxide resin coating composition for fire protection with a component (A), which contains at least one epoxide resin and at least one vinyl ester, a curing agent component (B), which contains at least one curing agent for the epoxide resin, and an intumesing component (C), which contains at least one acid constituent, at least one source of carbon and at least one gas-forming agent, components (A) and (B) being kept separate from one another to prevent reaction and reacting with one another with polymerization only while being mixed, as well as the use of this coating composition for providing steel construction elements with a fire protection coating.

25 Claims, 1 Drawing Sheet

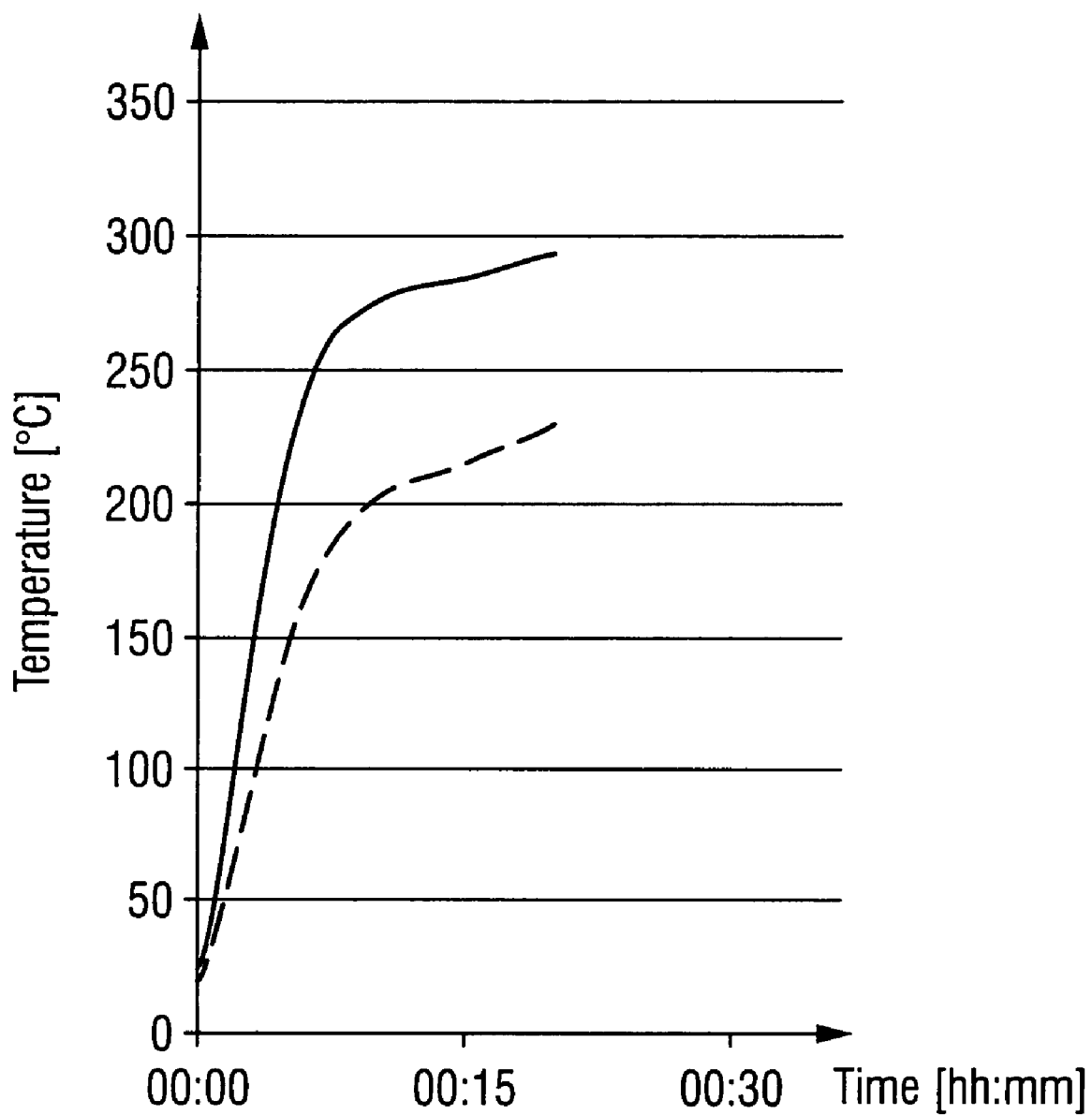

INTUMESCING, MULTI-COMPONENT EPOXIDE RESIN-COATING COMPOSITION FOR FIRE PROTECTION AND ITS USE

BACKGROUND OF THE INVENTION

1. Field of the Invention

The present invention relates to an intumescing, multi-component epoxide resin coating composition for fire protection with a component which contains at least one epoxide resin, a curing agent component which contains at least one curing agent for the epoxide resin, and an intumesing component which contains at least one acid constituent, at least one source of carbon, and at least one gas-forming agent, with the epoxide resin-containing component and the curing agent component being kept separate from one another to prevent reaction therebetween and reacting with one another with polymerization only while being mixed.

2. Description of the Prior Art

Intumescing coating compositions are used to protect steel construction elements against fire. They are applied on the steel construction elements. In the case of a fire, they expand because they contain intumescing components, which provides improved fire protection because of the resulting longer burn-up behavior. On the one hand, it must be possible to apply such fire protection coatings easily, quickly and with the fewest possible steps on the steel construction, which is to be protected. Moreover, these coatings must have short drying times. At the same time, they must develop the fire protection effect aimed for and, moreover, be weather resistant. They must therefore comply with stringent requirements, especially in the case of steel constructions on oil platforms.

Conventional, commercial, intumescing fire-protection coatings for protecting steel constructions in the visible region against fire are either water-based or solvent-based and are applied with the help of spraying equipment. This makes it necessary to apply the coating in several steps in order to achieve a coating of the required thickness and leads to a comparatively long drying process for these conventional coating compositions and to a lengthy process for producing the coating. In addition, the water-based coating compositions in every case require an additional covering coating, which prevents the water-soluble additives, which produce the intumescence, being leached out of the coating. For steel constructions on oil platforms, such an additional covering coating represents an appreciable expense.

It is furthermore known that systems based on epoxide resins may be used to fulfill the weathering stability conditions for such fire protection coatings on steel construction of oil platforms. However, a consequence of such use is that the intumescing properties of such coatings are adversely affected, since, after it has cured, the epoxide resins in the coating has a very high thermal stability, so that, in the event of a fire, the coating does not soften and, consequently, the aimed-four intumescing behavior does not take place to the extent required. Furthermore, very large thicknesses of the fire protection coatings in the centimeter range are required.

An object of the present invention is a coating composition for producing intumescing coatings for protecting steel against fire.

Another object of the invention is an intumescing coating composition that can be applied easily and quickly and that has a high weathering resistance and, finally, possesses a comparatively low thermal stability, so that the intumescing properties, required for fire protection, can be attained readily even with layers having a small thickness.

SUMMARY OF THE INVENTION

These and other objects of the present invention, which will become apparent hereinafter are achieved by using an epoxy vinyl ester hybrid polymer system containing an intumescing component. This hybrid polymer system comprises an epoxide resin portion, which ensures the high weathering resistance of the coating, and a vinyl ester portion, which, because of its low thermal stability, makes optimum intumescence of the coating in the event of a fire possible.

According to the invention, there is provided an intumescing multi-component epoxide resin coating composition for fire protection with a component which contains at least one epoxide resin, a curing agent component which contains at least one curing agent for the epoxide resin, and an intumescing component which contains at least one acid component, at least one source of carbon and at least one gas-forming agent, the epoxide resin-containing component and the curing agent component being present separately in order to inhibit reaction therebetween and reacting with polymerization only when mixed, the composition being characterized in that the epoxide resin-containing component contains at least one vinyl ester.

As a vinyl ester, the inventive coating composition preferably contains at least one representative of the group comprising alkyl(meth)acrylates, aryl(meth)acrylates, hydroxyalkyl(meth)acrylates, (meth)acrylamides, ether(meth)acrylates, multi-functional cross-linking (meth)acrylates, vinyl ester urethane resins, alkoxylated bisphenol A di(meth)acrylates, alkoxylated bisphenol F di(meth)acrylates, (meth)acrylic acid, (meth)acrylic anhydride and (meth)acrylonitrile.

Vinyl esters, preferred pursuant to the invention, are selected from the group comprising methyl methacrylate, ethyl(meth)acrylate, n-butyl(meth)acrylate, 1-butyl(meth)acrylate, n-hexyl(meth)acrylate, 2-ethylhexyl(meth)acrylate, isodecyl(meth)acrylate, (meth)acrylate ester 13,0, (meth)acrylate ester 17,4, cyclohexyl(meth)acrylate, isobornyl (meth)acrylate, benzyl(meth)acrylate, 3,3,5-trimethylcyclohexyl(meth)acrylate, isotridecyl(meth)acrylate, stearyl (meth)acrylate, 2-hydroxyethyl(meth)acrylate, hydroxypropyl(meth)acrylate, 2-dimethyl-aminoethyl (meth)acrylate, 3-dimethylaminopropyl(meth)acrylamide, 2-trimethylammoniumethyl(meth)acrylate chloride, 3-trimethylammonium-propyl(meth)acrylamide chloride, 2-t-butylamino-ethyl(meth)acrylate, (meth)acrylamide, N-methylol (meth)acrylamide, N-butoxymethyl(meth)-acrylamide, ethyltriglycol(meth)acrylate, tetrahydrofurfuryl(meth)acrylate, methoxy(polyethylene glycol (350)) (meth)acrylate, methoxy(polyethylene glycol (500)) (meth)acrylate, methoxy(polyethylene glycol (750)) (meth)-acrylate, methoxy (polyethylene glycol (1000)) (meth)acrylate, ethoxylated (meth)acrylate ester (25 moles EO) of $C_{16}$-$C_{18}$ fatty alcohol mixtures, butylene diglycol(meth)acrylate, allyl(meth)acrylate, ethylene glycol di(meth)acrylate, diethylene glycol di(meth)acrylate, triethylene glycol di(meth)acrylate, tetraethylene glycol di(meth)acrylate, polyethylene glycol 200 di(meth)acrylate, polyethylene glycol 400 di(meth)acrylate, polyethylene glycol 600 di(meth)acrylate, polyethylene glycol 1000 di(meth)acrylate, 1,3-dihydroxybutane di(meth)acrylate, 1,4-dihydroxybutane di(meth)acrylate, 1,6-dihydroxyhexane di(meth)acrylate, 1,12-dihydroxydodecane di(meth)acrylate, glycerin di(meth)acrylate, trimethylol-propane tri(meth)acrylate, diurethane di(meth)acrylate, reaction products of polyfunctional isocyanate, optionally multihydric alcohol and/or optionally polyamine and a hydroxylalkyl (meth)acrylate, ethoxylated (2 EO) bisphenol A di(meth)

acrylate, ethoxylated (10 EO) bisphenol A di(meth)acrylate, (meth)acrylic acid, (meth)acrylic anhydride, maleic acid mono-2-(meth)-acryloyloxyethyl ester, N-(2-(meth)acryloyloxyethyl)-ethylene urea, N-(2-(meth)acryloyloxyethyl) ethylene-urea, ethylene cyanohydrin and acetone cyanohydrin.

For the nomenclature, employed for the vinyl esters named above, " . . . (meth)acrylate" is intended to include both the methacrylate, as well as the acrylate compound in question. Methyl(meth)acrylate therefore represents methyl methacrylate as well as methyl acrylate. The corresponding applies also for the (meth)acrylic derivatives and (meth)acrylamides.

As the epoxide resin in the epoxide resin-containing component, the inventive, intumescing, multi-component epoxide resin coating composition contains at least one representative of the group comprising polyglycidyl ethers of multihydric alcohols and/or phenols, bisphenol A resins, bisphenol F resins, novolak resins and epoxidized polysulfides.

The epoxidized polysulfides, preferably used pursuant to the invention, correspond to the general formula (I):

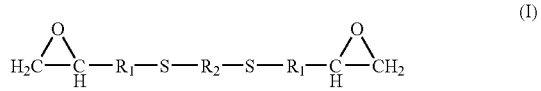

in which $R_1$ is an alkyl group with 1 to 6 carbon atoms or an aryl group, $R_2$ is a polysulfide group having the formula

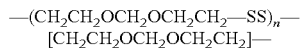

and n is a whole number with a value from 1 to 8.

As curing agent for the epoxide resin, the inventive coating composition preferably contains at least one representative of the group comprising aliphatic, cycloaliphatic, aromatic and/or araliphatic amines and polyamines, preferably benzylmethylamine and/or diethylenetriamine.

The intumescing component, contained in the inventive coating composition, comprises at least one acid component, at least one source of carbon and at least one gas-forming agent. As acid constituent of the intumescing component, melamine phosphate, magnesium phosphate, boric acid and ammonium poly-phosphate and mixtures thereof are preferred. As source of carbon, the intumescing component contains at least one representative of the group comprising pentaerythritol, dipentaerythritol, tripentaerythritol, starch and expanding graphite.

As gas-forming agent, the intumescing component preferably contains at least one representative of the group comprising melamine, melamine phosphate, melamine polyphosphate, melamine borate, melamine cyanurate, tris (hydroxyethyl) isocyanurate, ammonium polyphosphate and chlorinated paraffin.

Furthermore, pursuant to the invention, the coating composition preferably contains at least one catalyst for the curing reaction, such as 2,4,6-tris(dimethyl-aminomethyl)-phenol.

Furthermore, for improving the weathering properties further, the inventive coating composition may contain a reactive diluent, such as at least one representative of the group comprising glycerin triglycidyl ethers, pentaerythritol tetraglycidyl ethers, trimethylolpropane triglycidyl ethers, 1,4-dihydroxybutane diglycidyl ethers, cyclohexanedimethanol diglycidyl ethers, neopentyl glycol diglycidyl ethers, hexane diol diglycidyl ethers and propylene glycol diglycidyl ethers.

BRIEF DESCRIPTION OF THE DRAWINGS

The single drawing FIGURE shows:
a diagram illustrating courses of temperature with time for a steel plate coated with the coating composition according to the invention (dash lines) and for a steel plate coated with a conventional fire protection coating composition (solid lines).

DETAILED DESCRIPTION OF THE PREFERRED EMBODIMENT

The intumescing multi-component epoxide resin coating composition, preferred pursuant to the invention, contains 5 to 80% by weight and preferably 10 to 60% by weight of the at least one epoxide resin, 1 to 80% by weight and preferably 5 to 50% by weight of the at least one vinyl ester, 0.5 to 10% by weight and preferably 1 to 8% by weight of the at least one curing agent, 0.1 to 50% by weight and preferably 1 to 30% by weight of the at least one reactive diluent, 0.1 to 5% by weight and preferably 0.5 to 3% by weight of the at least one curing catalyst and 1 to 80% by weight and preferably 20 to 70% by weight of the intumescing component (C), the total amount of these components being 100% by weight.

Preferably, the intumescing component (C) comprises 1 to 50% by weight and preferably 5 to 30% by weight of the at least one acid component, 1 to 50% by weight and preferably 5 to 30% by weight of the at least one source of carbon and 0.1 to 30% by weight and preferably 1 to 20% by weight of the at least one gas-forming agent, the total amount of the constituents of the intumescing component (C) being 100% by weight.

The inventive, intumescing, multi-component epoxide resin coating composition may additionally contain conventional inorganic fillers, rheology aids, thixotropic agents, stabilizers, wetting agents, dyes, pigments and/or solvents, as known to those of ordinary skill in the art and, depending on the specific purpose, for which they are to be used.

In a particularly preferred manner, the components (A), the curing agent components (B) and the intumescing component (C) of the inventive multi-component epoxide resin coating composition are contained separately, to inhibit any reaction, in a two-chamber or multi-chamber device, from which they are removed, mixed and caused to react for the intended application.

Surprisingly, it has turned out that, due to the inventive combination of the at least one epoxide resin with at least one vinyl ester for the polymer matrix of the claimed coating composition, the properties of the two polymer systems, which are advantageous from the point of view of protecting steel construction elements in the event of a fire, can be combined in a hybrid system. In this connection, the epoxide resin portion in the hybrid polymer system ensures the high weathering resistance of the coating. On the other hand, the comparatively low thermal stability of the vinyl ester portion sees to it that the expansion of the intumescing component is optimum. Surprisingly, a high weathering stability is achieved even under the rough conditions, to which, for example, oil platforms anchored at sea are exposed. In an unexpected manner, furthermore, the aimed for fire resistance of steel construction elements with a layer thickness of 500 to 3000 μm can be achieved with the inventive coating composition. Since the inventive coating composition is a solventfree reactive system, the required thickness of a layer can therefore be applied within a very short time without great effort.

The aimed-for requirements with respect to the processing properties, that is, the drying time, the weathering stability, etc. and the fire resistance time of the coating material can be adjusted selectively by varying the composition of the of the coating material with respect to the resin component (A), the curing component (B) and the intumescing component (C). The inventive coating material may be cured either thermally or at room temperature or at a temperature of the surroundings.

Because of these advantageous properties, the invention also relates to the use of this intumescing multi-component epoxide resin coating composition as a coating for protecting steel constructions and steel construction elements against fire.

The following examples explain the invention further.

Example 1

The following constituents are used for preparing the inventive, intumescing, two-component epoxide resin coating composition:
Component (A):
1. epoxide resin: 22.2% by weight of bisphenol A/F resin (Epilox AF 18-30)
2. epoxide resin: 11.2% by weight of epoxylated polysulfide (Thioplast EPS 25)
3. accelerator: 1.1% by weight of 2,4,6-tris(dimethylaminomethyl)-phenol (TR-30)
4. vinyl ester: 2.2% by weight of dimethylaminopropyl methacrylamide (DMAPMA)
5. vinyl ester: 11.2% by weight of ethoxylated (2 EO) bisphenol A dimethacrylate (SR 348L)
Curing Agent Component (B):
6. curing agent: 2.7% by weight of diethylenetriamine (DETA)
7. Curing agent: 0.8% by weight of benzylmethylamine
Intumescing Component (C):
8. acid component: 17.5% by weight of ammonium polyphosphate (Exolith AP 422)
9. source of carbon: 13.2% by weight of pentaerythritol
10. gas-forming agent: 3.3% by weight of melamine polyphosphate (Melapur 200).
11. gas-forming agent: 3.3% by weight of melamine
12. pigment: 11.3% by weight of titanium dioxide Since the components of the binder are liquid, it is not necessary to use a solvent or water.

For preparing the resin component (A), constituents (1) to (5) are mixed in a dissolver and the constituents of the intumescing component (C) are mixed in subsequently. This mixture of binders is transferred to one chamber of a two-chamber device. The constituents (6) and (7) of the curing agent component (B) are mixed and transferred to the second chamber of the two-chamber device.

For the use as intended, the resin component (A), containing the intumescing component (C), is mixed with the curing agent component (B) and the coating composition obtained is applied on a primed steel plate and cured for 90 minutes at a temperature of 100° C.

Example 2

Component (A)

1. epoxide resin: 22.2% by weight of bisphenol A/F resin (Epilox AF 18-30)
2. epoxide resin: 11.2% by weight of epoxylated polysulfide (Thioplast EPS 25)
3. catalyst: 1.1% by weight of 2,4,6-tris(dimethylaminomethyl)-phenol (TR-30)
4. vinyl ester: 2.2% by weight of dimethylaminopropyl methacrylamide (DMAPMA)
5. vinyl ester: 11.2% by weight of hexafunctional aromatic urethane acrylate oligomer (Craynor 975)

Curing Agent Component (B)

6. curing agent: 2.7% by weight of diethylenetriamine (DETA)
7. Curing agent: 0.8% by weight of benzylmethylamine Intumescing Component (C)

8. acid component: 17.5% by weight of ammonium polyphosphate (Exolith AP 422)
9. source of carbon: 13.2% by weight of pentaerythritol
10. gas-forming agent: 3.3% by weight of melamine polyphosphate (Melapur 200).
11. gas-forming agent: 3.3% by weight of melamine
12. pigment: 11.3% by weight of titanium dioxide Since the components of the binder are liquid, it is not necessary to use a solvent or water.

The coating composition, formed as described in example 1, is applied on a primed steel plate and cured at room temperature within less than 10 minutes. This drying time of the inventive coating composition is surprisingly short, since conventional, commercial, intumescing, water-based coating compositions require drying times of about 24 hours.

Example 3

Burning Behavior

The burning behavior of the inventive coating composition of example 1 was compared with that of a conventional commercial steel fire protection coating composition. For this purpose, a metal sheet, 5 mm thick, is provided with a priming layer of about 50 µm on the side facing the fire during the burning test and then with a 2000 µm layer of the Intumescing coating composition. This sheet metal plate was then transferred into a laboratory fire test furnace so that the side of the metal sheet, provided with the coating composition, was exposed to the fire. A thermocouple for measuring the temperature was disposed on the opposite side of the sheet metal plate, which was averted from the fire. The courses of the temperature of the steel plate, coated pursuant to the invention and to the prior art, are given in the enclosed FIGURE, the broken curve representing the temperature curve of the inventive fire-protection coating, and the solid curve that of the comparison sample.

It can be seen that, with the inventive coating composition, a significantly better fire protection effect can be achieved. For example, the fire resistance time up to 500° C. of the metal sheet coated pursuant to the invention is 61 minutes, whereas that of the control sample is only 44 minutes.

Example 4

Weathering Resistance

The weathering resistance was investigated by means of a salt spray test of DIN 50021 ASTM B 117-60. Contrary to the conventional salt spray test, for which a steel plate is primed and coated completely, only the coating composition was tested. The initial thickness of the layer on rectangular 2×3 cm pieces of sheet steel was measured with an instrument at 5 points. The initial thickness of the dry layer was to have been about 0.1 mm. The samples were then placed in a plastic Petri dish filled with 10 mL of water and stored for defined time periods at 35° C. (in each case, 3 samples per time period). Subsequently, the water was discarded and the samples were dried for at least 24 hours at 35° C., after which the thickness of the layer was measured again at least at 5 points. In this way, the average decrease in the thickness of the drying layer is determined as a percentage.

In this investigation, it was observed that the thickness of the layer, formed with the inventive, Intumescing, multi-component epoxide resin coating composition, is constant during 14 days of storage in water at 35° C.

In contrast to the above, the thickness of the coating produced with a conventional, intumescing coating composition decreased already after six hours to about 80% and then remains approximately constant. A coating, produced with the help of a conventional, commercial, intumescing, solvent-based coating composition develops babbles when stored in water, is swollen after 14 days and studded with large bubbles. Admittedly, the thickness of the layer after drying is about the same as it was before the storage in water, so that no components of the intumescing component were washed out. However, from a customer point of view, such a behavior is not acceptable.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. An intumescing, hybrid polymer coating composition for fire protection comprising:
    a component (A), which contains at least one epoxide resin and at least one vinyl ester,
    a curing agent component (B), which contains at least one curing agent for the epoxide resin, and
    an intumesing component (C), which contains at least one acid constituent, at least one source of carbon and at least one gas-forming agent.

2. The intumescing composition of claim 1, wherein, as vinyl ester, it contains at least one representative of the group comprising alkyl(meth)acrylates, aryl(meth)acrylates, hydroxyalkyl(meth)acrylates, (meth)acrylamides, ether (meth)acrylates, multi-functional cross-linking (meth)acrylates, vinyl ester urethane resins, alkoxylated bisphenol A di(meth)acrylates, alkoxylated bisphenol F di(meth)acrylates, (meth)acrylic acid, (meth)acrylic anhydride and (meth) acrylonitrile.

3. The intumescing composition of claim 2, wherein, as vinyl ester, it contains at least one representative of the group comprising methyl(meth)acrylate, ethyl(meth)acrylate, n-butyl(meth)acrylate, 1-butyl(meth)acrylate, n-hexyl(meth) acrylate, 2-ethylhexyl(meth)acrylate, isodecyl(meth)acrylate, (meth)acrylate ester 13,0, (meth)acrylate ester 17,4, cyclohexyl(meth)acrylate, isobornyl(meth)acrylate, benzyl (meth)acrylate, 3,3,5-trimethylcyclohexyl(meth)acrylate, isotridecyl(meth)acrylate, stearyl(meth)acrylate, 2-hydroxyethyl(meth)acrylate, hydroxypropyl(meth)acrylate, 2-dimethyl-aminoethyl(meth)acrylate, 3-dimethylaminopropyl (meth)acrylamide, 2-trimethylammoniumethyl(meth) acrylate chloride, 3-trimethyl-ammonium-propyl(meth) acrylamide chloride, 2-t-butylamino-ethyl(meth)acrylate, (meth)acrylamide, N-methylol(meth)acrylamide, N-butoxymethyl(meth)-acrylamide, ethyltriglycol(meth)acrylate, tetrahydrofurfuryl(meth)acrylate, methoxy(polyethylene glycol (350)) (meth)acrylate, methoxy(polyethylene glycol (500)) (meth)acrylate, methoxy(polyethylene glycol (750)) (meth)-acrylate, methoxy(polyethylene glycol (1000)) (meth)acrylate, ethoxylated (meth)acrylate ester (25 moles EO) of $C_{16}$-$C_{18}$ fatty alcohol mixtures, butylene diglycol (meth)acrylate, allyl(meth)acrylate, ethylene glycol di(meth) acrylate, diethylene glycol di(meth)acrylate, triethylene glycol di(meth)acrylate, tetraethylene glycol di(meth)acrylate, polyethylene glycol 200 di(meth)acrylate, polyethylene glycol 400 di(meth)acrylate, polyethylene glycol 600 di(meth) acrylate, polyethylene glycol 1000 di(meth)acrylate, 1,3-dihydroxybutane di(meth)acrylate, 1,4-dihydroxybutane di(meth)acrylate, 1,6-dihydroxyhexane di(meth)acrylate, 1,12-dihydroxydodecane di(meth)acrylate, glycerin di(meth) acrylate, trimethylol-propane tri(meth)acrylate, diurethane di(meth)acrylate, reaction products of polyfunctional isocyanate, optionally multihydric alcohol and/or optionally polyamine and a hydroxylalkyl(meth)acrylate, ethoxylated (2 EO) bisphenol A di(meth)acrylate, ethoxylated (10 EO) bisphenol A di(meth)acrylate, (meth)acrylic acid, (meth) acrylic anhydride, maleic acid mono-2-(meth)-acryloyloxyethyl ester, N-(2-(meth)acryloyl-oxyethyl)-ethylene urea, N-(2-(meth)acryloyloxyethyl)ethylene-urea, ethylene cyanhydrin and acetone cyanhydrin.

4. The intumescing composition of claim 1, wherein the component (A), as epoxide resin, contains at least one representative of the group comprising polyglycidyl ether of multihydric alcohols and/or phenols, bisphenol A resins, bisphenol F resins, novolak resins and epoxidized polysulfides.

5. The intumescing composition of claim 4, wherein, as epoxidized polysulfide, it contains a compound of the general formula (I):

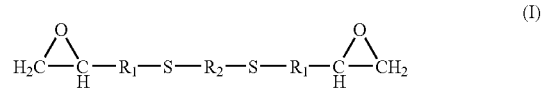

in which $R_1$ is an alkyl group with 1 to 6 carbon atoms or an aryl group, $R_2$ is a polysulfide group having the formula

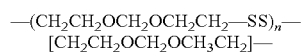

and n is a whole number with a value from 1 to 8.

6. The intumescing composition of claim 1, wherein, as curing agent for the epoxide resin, it contains at least one representative of the group comprising the aliphatic, cycloaliphatic, aromatic and/or araliphatic amines and polyamines, preferably benzylamine and/or diethylenetriamine.

7. The intumescing composition of claim 1, wherein, as acid constituent of the intumescing component (C), it contains at least one representative of the group comprising melamine phosphate, magnesium phosphate, boric acid and ammonium polyphosphate.

8. The intumescing composition of claim 1, wherein, as source of carbon, the intumescing component (C) contains at least one representative of the group comprising pentaerythritol, dipentaerythritol, tripentaerythritol, starch and expanding graphite.

9. The intumescing composition of claim 1, wherein, as gas forming agent, the intumescing component (C) contains at least one representative of the group comprising melamine, melamine phosphate, melamine polyphosphate, melamine borate, melamine cyanurate, tris(hydroxyethyl)isocyanurate, ammonium polyphosphate and chlorinated paraffin.

10. The intumescing composition of claim 1, further comprising at least one catalyst for the curing reaction.

11. The intumescing composition of claim 1, further comprising at least one reactive diluent for the curing reaction.

12. The intumescing composition of claim 11, wherein, as reactive diluent for the curing reaction, the coating composition contains at least one representative of the group comprising glycerin triglycidyl ether, pentaerythritol tetraglycidyl ether, trimethylolpropane triglycidyl ether, 1,4-dihydroxybutane diglycidyl ether, cyclohexanedimethanol diglycidyl ether, neopentyl glycol diglycidyl ether, hexane diol diglycidyl ether and propylene glycol diglycidyl ether.

13. The intumescing composition of claim 1, including 5 to 80% by weight and preferably 10 to 60% by weight of the at least one epoxide resin, 1 to 80% by weight and preferably 5 to 50% by weight of the at least one vinyl ester, 0.5 to 10% by weight and preferably 1 to 8% by weight of the at least one curing agent, 0.1 to 50% by weight and preferably 1 to 30% by weight of the at least one reactive diluent, 0.1 to 5% by weight and preferably 0.5 to 3% by weight of the at least one curing catalyst and 1 to 80% by weight and preferably 20 to 70% by weight of the intumescing component (C), the total amount of these components being 100% by weight.

14. The intumescing composition of claim 13, wherein the intumescing component (C) comprises 1 to 50% by weight and preferably 5 to 30% by weight of the at least one acid component, 1 to 50% by weight and preferably 5 to 30% by weight of the at least one source of carbon and 0.1 to 30% by weight and preferably 1 to 20% by weight of the at least one gas-forming agent, the total amount of the constituents of the intumescing component (C) being 100% by weight.

15. The intumescing composition of claim 1, further comprising inorganic fillers, rheological aids, thixotropic agents, stabilizes, wetting agents, dyes, pigments and/or solvents.

16. The intumescing composition of claim 1, wherein the components (A) and (B) are kept separate from one another to prevent reaction and reacting with one another with polymerization only while being mixed.

17. A method of protecting steel construction elements against fire comprising the steps of:
providing an intumescing hybrid polymer coating composition for fire protection including a component (A), which contains at least one epoxide resin and at least one vinyl ester, a curing agent component (B), which contains at least one curing agent for the epoxide resin, and an intumescing component (C), which contains at least one acid constituent, a source of carbon and at least one gas-forming agent, components (A) and (B) being kept separate from one another to prevent reaction and reacting with one another with polymerization only while being mixed; and
coating the construction elements with the intumescing multi-component epoxide resin coating composition.

18. The intumescing composition of claim 1, wherein the component (A), the curing component (B) and the intumescing component (C) are each contained separately from one another in order to inhibit any reaction and are caused to react under use conditions.

19. The intumescing composition of claim 18, wherein the component (A), the curing component (B) and the intumescing component (C) are each contained in separate chambers of a multi-chamber device.

20. The intumescing composition of claim 1, wherein a mixture of the component (A) and the intumescing component (C), and the component (B), are each contained separately from one another in order to inhibit any reaction and are caused to react under use conditions.

21. The intumescing composition of claim 20, wherein the mixture of the component (A) and the intumescing component (C), and the component (B), are each contained in a separate chamber of a two-chamber device.

22. The intumescing composition of claim 1, wherein component (A) includes, as the at least one vinyl ester, a (meth)acrylamide and at least one additional vinyl ester.

23. The intumescing composition of claim 22, wherein the at least one additional vinyl ester is at least one representative of the group comprising alkyl(meth)acrylates, aryl(meth)acrylates, hydroxyalkyl(meth)acrylates, ether(meth)acrylates, multi-functional cross-linking (meth)acrylates, vinyl ester urethane resins, alkoxylated bisphenol A di(meth)acrylates, alkoxylated bisphenol F di(meth)acrylates, (meth) acrylic acid, (meth)acrylic anhydride and (meth)acrylonitrile.

24. The intumescing composition of claim 23, wherein, as the (meth)acrylamide of the vinyl ester, it contains at least one representative of the group comprising 3-dimethylaminopropyl(meth)acrylamide, 3-trimethyl-ammonium-propyl(meth) acrylamide chloride, (meth)acrylamide, N-methylol(meth) acrylamide and N-butoxymethyl(meth)-acrylamide.

25. The intumescing composition of claim 23, wherein, as the at least one additional vinyl ester, it contains at least one representative of the group comprising methyl(meth)acrylate, ethyl(meth)acrylate, n-butyl(meth)acrylate, 1-butyl (meth)acrylate, n-hexyl(meth)acrylate, 2-ethylhexyl(meth) acrylate, isodecyl(meth)acrylate, (meth)acrylate ester 13,0, (meth)acrylate ester 17,4, cyclohexyl(meth)acrylate, isobornyl(meth)acrylate, benzyl(meth)acrylate, 3,3,5-trimethylcyclohexyl(meth)acrylate, isotridecyl(meth)acrylate, stearyl(meth)acrylate, 2-hydroxyethyl(meth)acrylate, hydroxypropyl(meth)acrylate, 2-dimethyl-aminoethyl (meth)acrylate, 2-trimethylammoniumethyl(meth)acrylate chloride, 2-t-butylamino-ethyl(meth)acrylate, ethyltriglycol (meth)acrylate, tetrahydrofurfuryl(meth)acrylate, methoxy (polyethylene glycol (350)) (meth)acrylate, methoxy(polyethylene glycol (500)) (meth)acrylate, methoxy (polyethylene glycol (750)) (meth)-acrylate, methoxy (polyethylene glycol (1000)) (meth)acrylate, ethoxylated (meth)acrylate ester (25 moles EO) of $C_{16}$-$C_{18}$ fatty alcohol mixtures, butylene diglycol(meth)acrylate, allyl(meth)acrylate, ethylene glycol di(meth)acrylate, diethylene glycol di(meth)acrylate, triethylene glycol di(meth)acrylate, tetraethylene glycol di(meth)acrylate, polyethylene glycol 200 di(meth)acrylate, polyethylene glycol 400 di(meth)acrylate, polyethylene glycol 600 di(meth)acrylate, polyethylene glycol 1000 di(meth)acrylate, 1,3-dihydroxybutane di(meth) acrylate, 1,4-dihydroxybutane di(meth)acrylate, 1,6-dihydroxyhexane di(meth)acrylate, 1,12-dihydroxydodecane di(meth)acrylate, glycerin di(meth)acrylate, trimethylol-propane tri(meth)acrylate, diurethane di(meth)acrylate, reaction products of polyfunctional isocyanate, optionally multihydric alcohol and/or optionally polyamine and a hydroxyalkyl (meth)acrylate, ethoxylated (2 EO) bisphenol A di(meth) acrylate, ethoxylated (10 BO) bisphenol A di(meth)acrylate, (meth)acrylic acid, (meth)acrylic anhydride, maleic acid mono-2-(meth)-acryloyloxyethyl ester, N-(2-(meth)acryloyl-oxyethyl)-ethylene urea, N-(2-(meth)acryloyloxyethyl) ethylene-urea, ethylene cyanhydrin and acetone cyanhydrin.

* * * * *